May 2, 1933. T. V. BUCKWALTER 1,906,530
BLANK FOR AND METHOD OF MAKING AXLE REENFORCEMENTS
Filed June 8, 1931 2 Sheets-Sheet 1
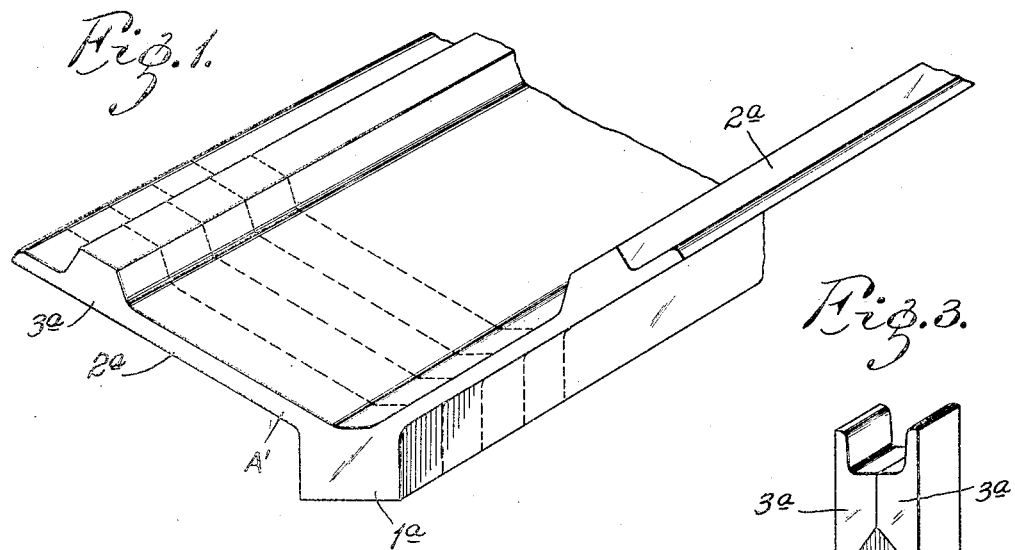
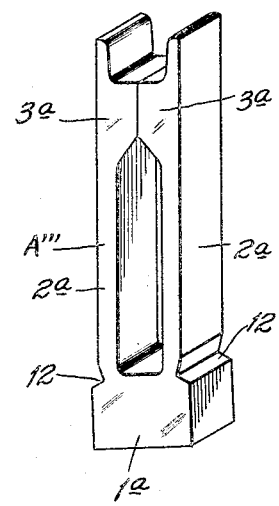
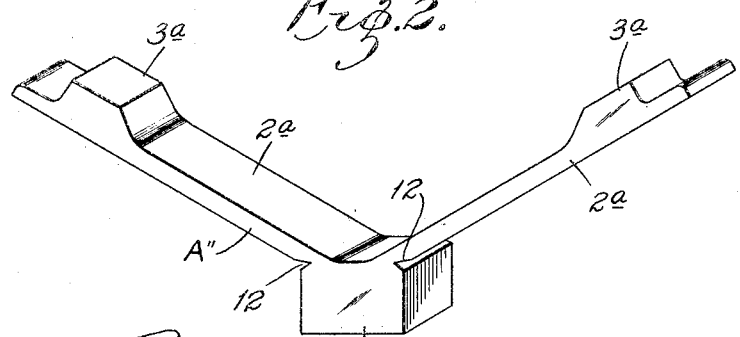
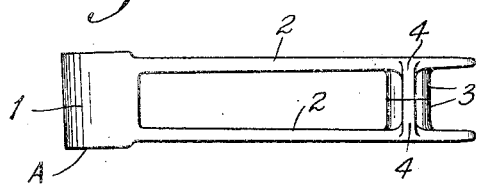
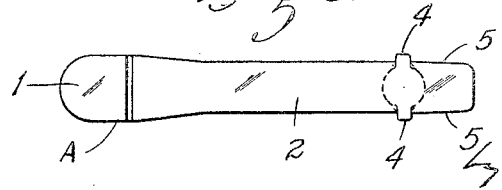
INVENTOR:
Tracy V. Buckwalter
HIS ATTORNEYS May 2, 1933.    T. V. BUCKWALTER    1,906,530
BLANK FOR AND METHOD OF MAKING AXLE REENFORCEMENTS
Filed June 8, 1931    2 Sheets-Sheet 2
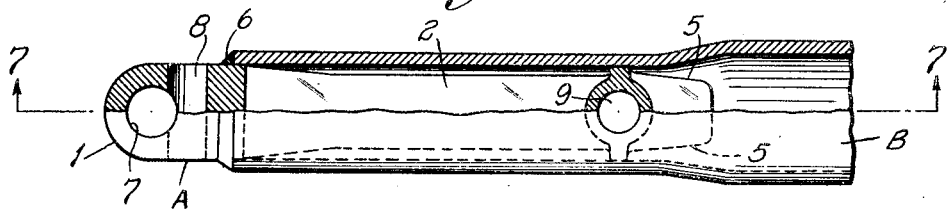
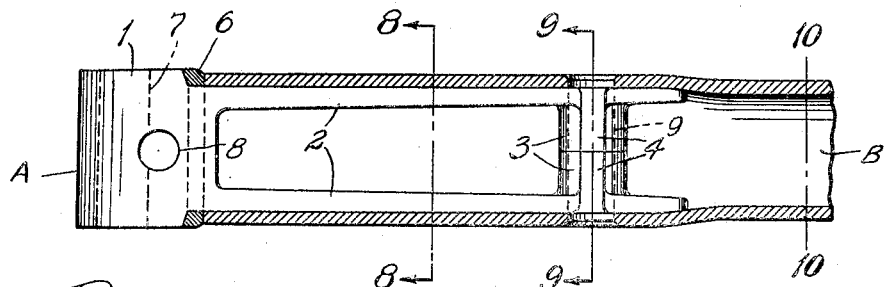
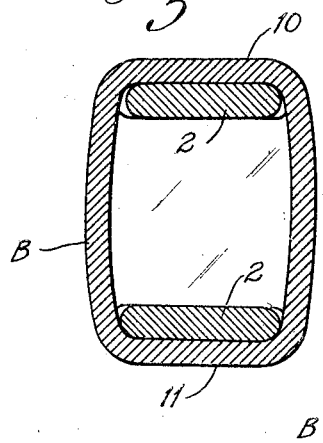
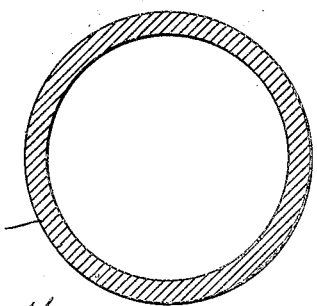
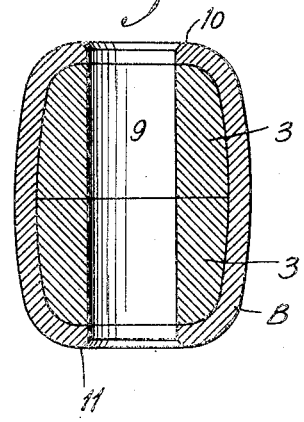
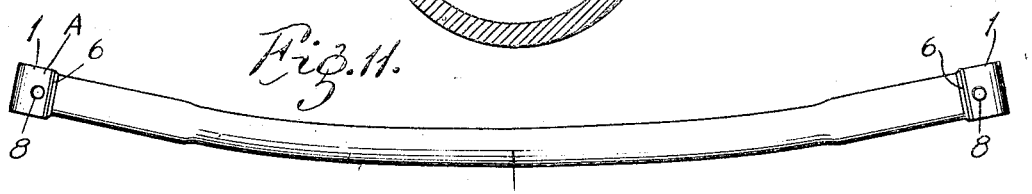
INVENTOR:
Tracy V. Buckwalter
by [signature]
HIS ATTORNEYS.

Patented May 2, 1933

1,906,530

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

BLANK FOR AND METHOD OF MAKING AXLE REENFORCEMENTS

Application filed June 8, 1931. Serial No. 542,757.

This invention relates to a device for reenforcing the tubular end portions of vehicle axles and to the process of making the same. Its principal object is to produce a device that will add great strength to the axle and which is well adapted for economical manufacture. It consists in the axle reenforcing member hereinafter described and claimed. It also consists in the process hereinafter described of making said axle reenforcing member.

In the accompanying drawings, which form part of this specification and wherein like symbols refer to like parts wherever they occur, Fig. 1 is a perspective view of a rolled bar of suitable cross-section for the manufacture of my axle reenforcing member, said bar being of considerable length, Fig. 2 is a perspective view of a section cut from said bar of the proper length for a single reenforcing member, Fig. 3 is a perspective view of said section with its arms folded, Fig. 4 is a side elevation of the completed reenforcing member after forging, Fig. 5 is a plan view of the completed reenforcing member, Fig. 6 is a plan view, partly in section, illustrating the reenforcing member applied to the end of a tubular axle, Fig. 7 is a vertical longitudinal cross-section on the line 7—7 in Fig. 6, Figs. 8, 9 and 10 are vertical transverse cross-sections on the lines 8—8, 9—9 and 10—10, respectively, in Fig. 7; and Fig. 11 is a side elevation of the completed axle.

My axle reenforcing member or insert A comprises a thick end portion 1, which is of a width and depth sufficient to afford the strength necessary for mounting a suitable steering knuckle and arms 2 extending therefrom substantially parallel and having abutting cylindrical lugs 3 projecting from their opposing faces near their ends. These lugs are intended to be bored to receive the bolt or like device that secures the vehicle spring, and their spacing from the thick end portion 1 is determined accordingly. The thick end portion 1 of the insert A is made wider than the arms that project therefrom and is preferably rounded at its outer end and extends slightly above and below the two arms 2 that project therefrom. The abutting lugs 3 are provided on opposite sides of the insert with vertical ribs 4 that extend from top to bottom of said lugs and are slightly convex endwise and rounded where they merge into the arms 2; and the portions of said arms located beyond said abutting lugs are beveled, as at 5, so as to facilitate the entry of the insert into the bore of the tubular axle B in whose ends they are to be inserted.

One of the above inserts or reenforcing members A is inserted in each end of the tubular axle B with its spaced parallel arms 2 frictionally engaging the interior surface of the tube preferably at the top and bottom thereof and with the convex ribs 4 frictionally engaging said interior surface on opposite sides of said tube. In addition to this frictional engagement, it is desirable to weld the parts together. For instance, as indicated at 6, the endmost portion of the tube may be welded to the thick end portion 1 of the insert that projects therefrom; and the tube may be spot-welded to the ribs 4 that project from the opposite sides of the abutting lugs 3 near the ends of the arms. For this purpose, the horizontal width of the arms is somewhat less than the overall distance between the convex faces of opposite ribs. After the inserts or reenforcing members have been welded in the ends of the tubular axle, the axle is placed in suitable dies and bent, as shown in Fig. 11, in a substantially continuous curve from one end to another to obtain the required drop at the middle thereof. The projecting portion of the insert is provided with a vertical bore 7 to receive the knuckle pin or bearing therefor; and it is also provided with a horizontal cross-bore 8 for a locking pin. A vertical hole 9 for the spring fastening bolt is drilled through the tube and the abutting lugs 3 near the inner end of the two arms 2 of the insert. The operation of drilling the holes 7, 8 and 9 is preferably performed after the inserts have been welded to the axle tube and after the latter has been bent to the required shape.

In mounting the insert in the ends of the axle tube, said members preferably operate after the manner of a mandrel to change the cross-sectional shape of the end portions of the tube from a circle, as shown in Fig. 10, to an oblong form, that is, to a form which has substantially straight and relatively short top 10 and bottom 11, and sides that are relatively long and slightly convexed, the corners of the oblong being rounded, all as shown in Figs. 8 and 9.

According to the preferred process of making the above described insert, which process is a part of my invention, a bar A' of steel of any convenient length and of the cross-section hereinafter described is hot-rolled from a suitable billet. The bar A' comprises a thick middle portion 1a of oblong cross-section, and elongated arms 2a diverging upwardly and outwardly from the upper corners of said middle section and provided with ribs 3a on the inner faces thereof near their ends. The bar A' is cut into short lengths or slugs A" of the mass required for the finished reenforcing member; and notches 12 are cut in the opposite sides of each slug at the meeting points of the converging sides of the middle portion 1a and the elongated arms 2a thereof. The slug A" is then placed in a suitable press and the two arms 2a of said slug are folded towards each other with their ribs 3a abutting flatwise, thereby forming a blank A'" of approximately the size and shape required for the finished reenforcing member. The blank A'" is then placed in a suitable forging machine, preferably of the coin press type, and formed into the finished reenforcing member A. During this forging operation the narrow convex ribs 4 are formed, and the other parts of the blank given their final shaping.

Obviously, some of the advantages of my process can be obtained without following all of the operations in the order hereinbefore set forth. For instance, the holes for the knuckle pins and spring bolts may be formed in the inserts before the inserts are mounted in the axle, instead of boring such holes after the inserts are secured to the axle. Likewise, while I have described my process in connection with inserts for tubular axles it is also adapted for inserts for other tubular members and the process may be used in the manufacture of other forgings.

What I claim is:

1. The process of making reenforcing devices for tubular axles which comprises rolling a bar with a thick middle portion, with elongated arms diverging from one face thereof and with ribs on the inner faces thereof near their ends, cutting off a section of said bar, cutting notches in the opposite sides of said section at the meeting points of the converging sides of the thick middle portion and the elongated arms thereof, folding said arms into parallel relation with their ribs in contact, and then die-forging the folded section into the shape desired for the finished reenforcing device.

2. The process of making reenforcing devices for tubular axles which comprises making a blank with its middle portion of somewhat greater width than the outside diameter of the tubular axle and with a pair of spaced widely diverging arms extending from one face of said middle portion and having lugs on their adjacent faces, cutting notches in the angles between said arms and the side faces of said middle portion and then folding said arms substantially parallel with each other.

3. The process of making reenforcing devices for tubular axles, which comprises rolling a long bar with a thick rib at the middle thereof of somewhat greater width than the outside diameter of the tubular axle and with a pair of spaced widely diverging arms extending from one face of said rib and with ribs near but spaced from the ends of said arms on the adjacent faces thereof, cutting notches in the angles between said arms and the side faces of said middle rib, cutting off a section of said bar and then folding the arms of said section substantially parallel with each other.

4. A blank for reenforcing devices for tubular axles comprising a thick middle portion of greater width than the outside diameter of the tubular axle, a pair of spaced widely diverging arms extending from one face of said thick middle portion and lugs on the adjacent faces of said arms near the ends thereof, said blank having notches in the angles between said arms and the sides of said thick middle portion.

5. The process of making reenforcing devices for tubular axles which comprises rolling a bar with a thick middle portion, with spaced elongated arms diverging from one face thereof and with ribs on adjacent faces of said arms near the ends thereof, cutting off a section of said bar, and then folding the arms of said section into substantially parallel relation with their ribs in contact and with their outer surfaces spaced apart less than the width of said thick middle portion.

6. The process of making reenforcing devices for tubular axles which comprises rolling a bar with a thick middle portion, with spaced elongated arms diverging from one face thereof and with ribs on adjacent faces of said arms near but spaced from the ends thereof, cutting off a section of said bar with a length slightly less than the bore of the axle tube to be reenforced, and then folding said arms into parallel relation with their ribs in contact and with their outer surfaces spaced apart less than the width of said thick middle portion.

7. The process of making reenforcing devices for tubular axles which comprises rolling a bar with a thick middle portion, with spaced elongated arms diverging from one face thereof and with ribs on adjacent faces of said arms near but spaced from the ends thereof, cutting off a section of said bar, folding said arms into parallel relation with their ribs in contact and with their outer surfaces spaced apart less than the width of said thick middle portion, and then die-forging said folded section to the shape desired for the finished reenforcing device.

8. The process of making reenforcing devices for tubular axles which comprises rolling a bar with a thick middle portion, with spaced elongated arms diverging from one face thereof and with ribs on adjacent faces of said arms near the ends thereof, cutting off a section of said bar, folding the arms of said section into parallel relation with their ribs in contact and with their outer surfaces spaced apart less than the width of said thick middle portion, and then die-forging said folded section to form said ribs with projections that project on opposite sides of said arms for the purposes set forth.

9. The process of making reenforcing devices for tubular axles which comprises rolling a bar with a thick middle portion, with spaced elongated arms diverging from one face thereof and with ribs on adjacent faces of said arms near the ends thereof, cutting off a section of said bar, folding the arms of said section into parallel relation with their ribs in contact and with their outer surfaces spaced apart less than the width of said thick middle portion, and then die-forging said folded section to form said ribs with projections that project on opposite sides of said arms and have convexly curved outer faces and to taper the end portions of said arms for the purposes set forth.

Signed at Canton, Ohio, this 29 day of May 1931.

TRACY V. BUCKWALTER.